United States Patent Office 3,190,919 Patented June 22, 1965

3,190,919

PREPARATION OF QUATERNARY AMMONIUM COMPOUNDS

Ronald R. Swanson, Minneapolis, Minn., assignor to General Mills, Inc., a corportion of Delaware No Drawing. Filed June 14, 1961, Ser. No. 116,973
4 Claims. (Cl. 260—567.6)

This invention relates to a method of preparing quaternary ammonium compounds and more particularly to a method of converting quaternary ammonium compounds having a particular anion into quaternary ammonium compounds having a different anion.

According to the prior art, a quaternary ammonium compound can be converted to a different quaternary ammonium compound having a desired anion, by repeatedly contacting an organic solution of the quaternary with an aqueous solution containing the desired anion. Thus, to convert a quaternary of the form $R_4NX$ to the form $R_4NY$, the compound $R_4NX$ would be dissolved in a suitable organic solvent and then repeatedly contacted with an aqueous solution containing the anion $Y^-$. The quaternary ammonium compound having the formula $R_4NY$ would be formed in the organic phase while the anion $X^-$ would be transferred to the aqueous phase. Thus, the reaction can be illustrated by the following equation:

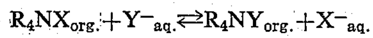

$$R_4NX_{org.}+Y^-_{aq.}\rightleftarrows R_4NY_{org.}+X^-_{aq.}$$

While this method is useful in laboratory scale preparations, it is cumbersome to carry out commercially. Generally, several stages of a liquid-liquid extraction are necessay which requires considerable equipment and large amounts of solvents. Thus, on a commercial scale the reaction has been found to be cumbersome, expensive, and somewhat hazardous, due to the large amounts of solvent employed.

Another method of preparing quaternary ammonium compounds is by the use of an ion exchange resin containing the desired anion. The starting quaternary compound is passed through the exchange column. The resin releases the desired anion and absorbs the anion of the starting material. This method is useful on a laboratory scale but highly impractical on a commercial scale. For example, a dilute solution of the quaternary must be employed, necessitating large quantities of solvents. In addition, ion exchange resins are quite expensive and must be periodically replaced. Unfortunately, large quantities of the resin are required; first, because of the low capacity inherent in exchange resins and secondly, because of the poor transfer coefficients attendant with the use of non-protic solvents, such as, hydrocarbons. Further, regeneration is very difficult and expensive when non-protic solvents are employed. Several washings with several different solvents are necessary to regenerate the resin because the resins are normally treated with an aqueous solution in the regeneration treatment. Thus, the resin must be converted from an organic-wet resin to a water-wet resin and back to an organic-wet resin, in addition to the chemical regenerative treatment. The cumulative effect of these disadvantages causes the use of an ion exchange resin to be highly uneconomical.

It is an object of this invention to provide a novel method for preparing quaternary ammonium compounds. It is another object of this invention to provide a process for conversion of a quaternary ammonium compound to another quaternary ammonium compound having a different anion. It is a further object of this invention to provide a novel and highly economic process for preparing quaternary ammonium compounds. Other objects will appear hereinafter.

The objects of this invention are accomplished by a process which comprises contacting an organic solvent solution of a quaternary ammonium compound having an anion of a volatile acid with an aqueous solution of a non-volatile acid, passing a gas through said aqueous solution, and recovering a quaternary ammonium compound having an anion of a non-volatile acid formed thereby. In accordance with the present invention it was discovered that quaternary ammonium compounds having a particular anion could be converted to quaternary ammonium compounds having a dissimilar anion, economically and simply by the aforementioned process.

As use herein, the term "volatile acid" refers to an acid which may be readily stripped from an aqueosu solution by passing an inert gas therethrough. Specific examples of suitable volatile acids include sulfurous acid, carbonic acid, acetic acid, and hydrosulfuric acid. The term "non-volatile acid" as used herein refers to an acid which is not readily removed from an aqueous solution thereof by passing inert gas therethrough. Specific example of suitable non-volatile acids include sulfuric acid, phosphoric acid, hydrochloric acid, oxalic acid, hydrobromic acid, and trichloroacetic acid. While there are various degrees of volatility included in the acids mentioned, the acid which is employed as the volatile acid must be one which is capable of being readily stripped from a solution as compared to the non-volatile acid.

In order to remove the volatile acid from the aqueous solution, an inert gas is passed through the solution. Gases which are preferred for this purpose air, oxygen, nitrogen, and the rare gases. In some instances, carbon dioxide is inert to the reaction mixture, and in these cases it may be employed.

The organic solvent used to dissolve the quaternary ammonium compound is not critical. The solvent should, of course, be inert to the reaction mixture and not be effected by the acid employed. In most instances, it is desirable to have a solvent that will dissolve substantial amounts of the quaternary ammonium compound. In addition to these properties, it is preferred to employ solvents having a low volatility, so that little will be lost during the stripping operation. Since the process requires two phases, the solvent must be one which is not soluble in water and one which will retain the quaternary ammonium compound in solution even in the presence of large amounts of water. The most preferred solvents are such hydrocarbons as kerosene and fuel oil. Under other circumstances, it may be desirable to employ materials such as benzene, and other aromatic hydrocarbons, trichloroethylene and other chlorinated hydrocarbons, as well as higher ketones, alcohols, esters and ethers.

Some quaternary ammonium compounds are sparingly soluble in certain organic solvents, particularly the aliphatic hydrocarbon solvents. In these cases it is convenient to employ "solvent modifiers," as they are referred to in the art, in order to increase the solubility of the quaternary. Specific examples of typical modifiers include isodecanol, tributyl phosphate, and dodecyl phenol. The solvent modifiers are added to the solvent in sufficient quantity to obtain the desired solubility of quaternary ammonium compound.

Generally, it is preferred to carry out the reaction at temperatures well below the boiling point of water. High temperatures necessitate expensive equipment and difficult process steps. In addition, quaternary ammonium compounds tend to degrade at high temperatures, thereby reducing the yield. Preferably, the reaction is carried out at a temperature of 10 to 60° C. Higher temperatures can be readily employed if low residence times are used. The optimum temperature, however, depends upon the materials employed and is best determined by trial. For most operations ambient temperature is satisfactory.

The process of the present invention is most profitably employed in converting quaternary ammonium sulfites to the corresponding quaternary ammonium sulfates since this conversion is one which is encountered on a large scale.

Generally, all water insoluble quaternary ammonium compounds having the anion of a volatile acid are useful as starting materials in the present invention. Particularly useful are those quaternary ammonium compounds having one or more fatty substituents on the nitrogen atom. The term "fatty" as used herein refers to acyclic hydrocarbon radicals having 8–18 carbon atoms. Specific examples of suitable quaternary ammonium compounds include lauryl trimethyl ammonium salts, palmityl trimethyl ammonium salts, stearyl trimethyl ammonium salts, coco trimethyl ammonium salts, tallow trimethyl ammonium salts, dicoco dimethyl ammonium salts, di(hydrogenated tallow) dimethyl ammonium salts, and tricaprylyl methyl ammonium salts.

The invention will be better understood with reference to the following example. Unless otherwise indicated, all parts and percentages used herein are by weight.

*Example*

A tricaprylyl methyl ammonium sulfite was prepared by repeatedly washing a kerosene solution containing 10% by weight of tricaprylyl methyl ammonium chloride and 3% isodecanol with a concentrated aqueous solution of sulfur dioxide. This organic solution was titrated with magnesium permanganate and found to be 0.55 normal in sulfite and dissolved sulfur oxide. To the solution was added an equal volume of 1 molar sulfuric acid. Air was blown through the reaction mixture and samples were taken of the organic phase at periodic intervals for analysis of sulfite plus dissolved sulfur dioxide. The following results were obtained.

| Time min.: | Normality of organic phase (sulfite + sulfur dioxide) |
|---|---|
| 0 | 0.55 |
| 5 | 0.016 |
| 10 | 0.003 |
| 25 | 0.0 |

After 25 minutes the air flow was stopped and the phases were separated. There was recovered a kerosene solution of tricaprylyl methyl ammonium sulfate.

The foregoing example is intended as an illustration of a preferred embodiment of the present invention and is not intended as a limitation on the scope thereof.

The embodiments of the invention in which an exclusive property or privilege is claimed are defined as follows:

1. The process which comprises contacting a water immisicible organic solvent solution of a fatty quaternary ammonium compound having an anion of a volatile acid with an aqueous solution of a non-volatile acid, passing a gas inert to the reaction mixture through said aqueous solution, and recovering a quaternary ammonium compound having an anion of a non-volatile acid.

2. The process for preparing fatty quaternary ammonium sulfates which comprises contacting a water immiscible organic solvent solution of a quaternary ammonium sulfite with an aqueous solution of sulfuric acid, passing an inert gas through said aqueous solution and recovering a quaternary ammonium sulfate.

3. The process of claim 2 wherein the inert gas is air.

4. The process of claim 2 wherein the organic solvent is kerosene.

References Cited by the Examiner

UNITED STATES PATENTS

| | | | |
|---|---|---|---|
| 2,146,406 | 2/39 | Piggot. | |
| 2,961,466 | 11/60 | Nielsen | 260—567.6 |
| 3,002,996 | 10/61 | Meier | 260—566 |

CHARLES B. PARKER, *Primary Examiner.*

LEON ZITVER, IRVING MARCUS, *Examiners.*